United States Patent [19] [11] 4,246,984

Seay, deceased et al. [45] Jan. 27, 1981

[54] SAFETY APPARATUS FOR WHEELCHAIRS

[75] Inventors: Robert L. Seay, deceased, late of Chula Vista, Calif.; by Euna A. Seay, executrix, 480 "I" St., Chula Vista, Calif. 92010; William E. Rogers, 248 Orange Ave.; Jack G. Willard, 1134 Twin Oaks Ave., both of Chula Vista, Calif. 92011

[73] Assignees: Mrs. Robert L. (Euna A.) Seay; Jack Gordon Willard; William Edward Rogers, all of Chula Vista, Calif.

[21] Appl. No.: 21,842

[22] Filed: Mar. 19, 1979

[51] Int. Cl.[3] .................................... B60T 1/04

[52] U.S. Cl. .................................... 188/2 F; 188/29; 410/19

[58] Field of Search .................... 296/19, 24 R, 65 R; 188/2 F, 29, 67; 410/9, 10, 18, 19, 20, 51

[56] References Cited

U.S. PATENT DOCUMENTS

| | | | |
|---|---|---|---|
| 3,840,265 | 10/1974 | Stirling et al. | 296/19 |
| 3,984,118 | 10/1976 | Wilson | 296/24 R X |
| 4,019,752 | 4/1977 | Leon et al. | 188/2 F X |
| 4,027,747 | 6/1977 | Moorman, Jr. | 188/2 F X |
| 4,128,144 | 12/1978 | Vassar | 188/29 X |

*Primary Examiner*—John J. Love
*Assistant Examiner*—Michael Mar
*Attorney, Agent, or Firm*—Brown & Martin

[57] ABSTRACT

A safety apparatus that holds wheelchairs in place as they are being transported in a motorized vehicle such as a van. The apparatus includes a rigid shaft that extends from the floor of the vehicle to several inches above one wheel of the wheelchair. A frame attaches to the shaft and holds it perpendicular to the floor of the vehicle. Also, a collar is provided which slides on the shaft. A yoke, having a rectangular opening that faces the floor of the vehicle, is attached to this collar. In operation, the top portion of one wheel on the wheelchair is placed within the opening of the yoke. A manually operated clamping mechanism stops the collar from sliding on the shaft during transportation of the wheelchair.

7 Claims, 5 Drawing Figures

SAFETY APPARATUS FOR WHEELCHAIRS

BACKGROUND OF THE INVENTION

This invention relates to apparatus used by handicapped persons; and in particular, the invention concerns apparatus for securing wheelchairs containing handicapped occupants as they are being transported in a motorized vehicle. Such apparatus is needed in order to prevent the wheelchair, and its occupant, from bouncing around or crashing into the interior portion of the vehicle whenever a sudden unexpected road hazard is encountered. For example, the vehicle may have to suddenly stop or swerve to avoid a child running into the road.

In the prior art, the only known apparatus for securing wheelchairs during transit consisted of an adjustable strap having both ends anchored to the floor of the vehicle. Such straps however have in practice been found to be quite inconvenient to use. For example, the handicapped person must be able to pick the unused straps off the floor while he is sitting in his wheelchair. Further, the straps are often adjusted either too loosely or too tightly. Thus, either the desired degree of stability is not achieved; or excessive mechanical stress is placed on the wheelchair.

Therefore, it is a primary object of the invention to provide an improved safety apparatus for holding wheelchairs in place as they are being transported.

Another object of the invention is to provide a wheelchair hold down device that is both effective and convenient for a handicapped person to operate.

SUMMARY OF THE INVENTION

These and other objects are accomplished in accordance with the invention by a safety device that includes a rigid shaft, which is securely attached by a frame, perpendicular to the interior floor of the vehicle in the area where the wheelchair is to be held. The shaft has a length that exceeds the height of a wheel on the chair to be held by several inches. Also included in the safety device is a collar that slides up and down the shaft. A yoke, having a rectangular opening that faces the floor of the vehicle, is attached to the collar. In operation, the collar and yoke are slid up on the shaft, and a wheel of the wheelchair is aligned under the opening of the yoke. Then the collar and yoke are slid down on the shaft until the top portion of the wheel extends through the opening of the yoke. A manually operated clamping means connects to the collar to stop it from sliding on the shaft as the yoke extends around the top portion of the wheel during transit.

BRIEF DESCRIPTION OF THE DRAWINGS

Various preferred embodiments of the invention will best be understood by reference to the following detailed description when read in conjunction with the accompanying drawings wherein.

DETAILED DESCRIPTION

Figure 1:
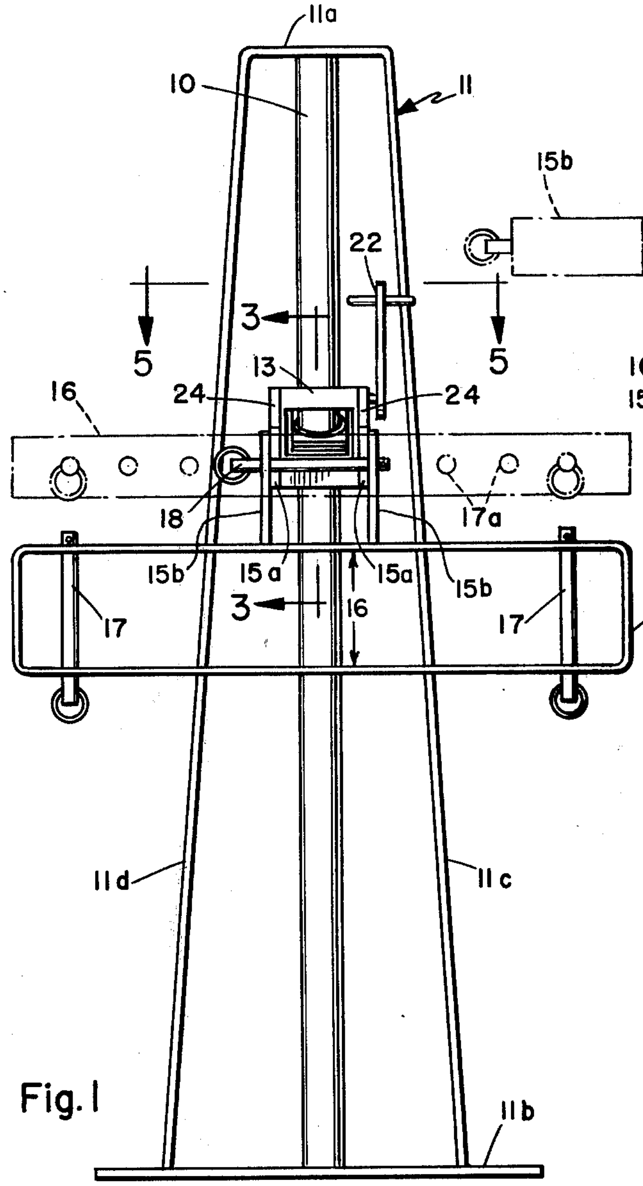
FIG. 1 is a front view of a safety apparatus constructed according to the invention.
Figure 2:
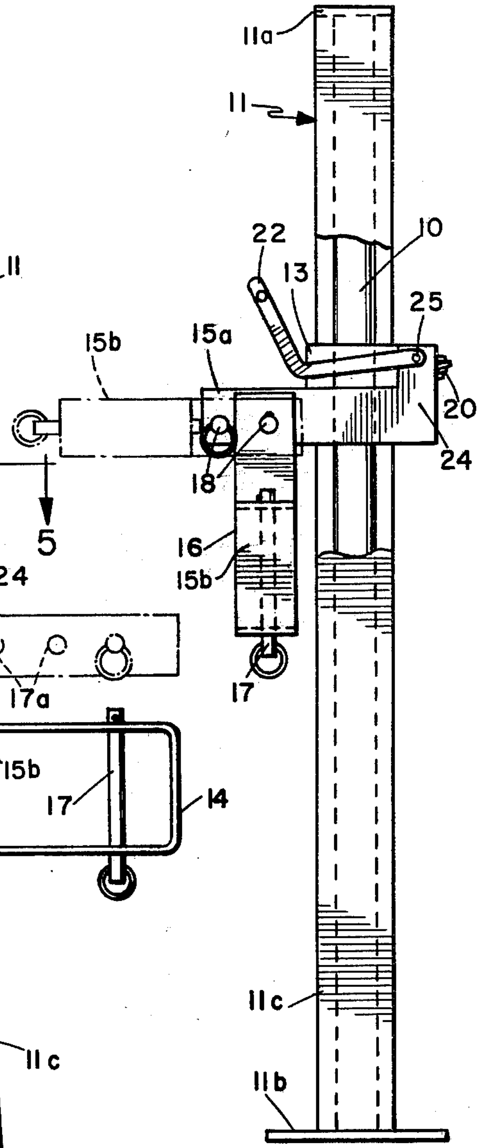
FIG. 2 is a side view of the safety apparatus of FIG. 1.

Referring now to FIGS. 1 and 2, the front and side views of a safety apparatus which is constructed according to the invention are illustrated. This apparatus includes a rigid shaft 10 which is permanently attached to a frame 11. Preferably, shaft 10 and frame 11 are made of steel. The shaft may have either a hollow center or a solid center. In general, shaft 10 has a length that is several inches longer that the diameter of the largest wheel on the wheelchairs that are to be held. Suitably, this length is approximately 28 inches. Also suitably, the diameter of shaft 10 is $\frac{3}{4}$ inches.

Frame 11 preferably includes a top plate **11*a*, a base plate 11*b*, and a pair of side posts 11*c* and 11*d*. Suitably, components 11*a*, 11*c*, and 11*d* are made of 3/16 inch by $1\frac{1}{2}$ inch steel; and component 11*b* is made of 3/16 inch by 3 inch steel. A plurality of holes 12 are included in base plate 11*b***. Thus the plate can be rigidly connected via screws to the floor of the vehicle where it is to be used.

The FIG. 1 embodiment further includes a collar 13 having a hole through which shaft 10 protrudes. This hole is slightly larger than the shaft diameter, and thus the collar is able to slide up and down the shaft.

A yoke 14 is attached to collar 13 by means of a pivot arm 15. The yoke has a rectangular shaped opening 16 through which is placed the top portion of a wheel on the wheelchair that is to be held. Suitably, yoke 14 measures 4 inches by 16 inches and is made of 3/16 inch steel.

In order to accommodate wheelchairs of various sizes, it is desirable that the size of opening 16 be adjustable. To that end, the preferred embodiment includes a plurality of spaced apart removable pins 17 extending through the opening of yoke 14. Suitably, the pins 17 are made of $\frac{1}{4}$ inch steel. Each of the pins are inserted through a pair of aligned holes **17*a*** in the sides of the yoke.

Preferably, pivot arm 15 includes one pair of parallel brackets **15*a* that are rigidly connected to collar 13, and another pair of parallel brackets 15*b* that are rigidly connected to yoke 14. These brackets are connected together by means of a pair of removable pins 18. When both of the pins 18 are in place, yoke 14 extends outward from the shaft 10 as shown in Phantom lines in FIG. 2 to allow it to be placed over the wheel of a wheelchair. Conversely, when only one of the pins 18 is in place, yoke 14 lies adjacent to shaft 10 as shown in solid lines in FIG. 2 where it will not be in the way. Either one of the pins 18 may be used as the hinge pin. And when the pins are inserted in opposite directions as illustrated in FIG. 2**, one pin can always be readily removed by both left handed and right handed persons.

Figure 3:
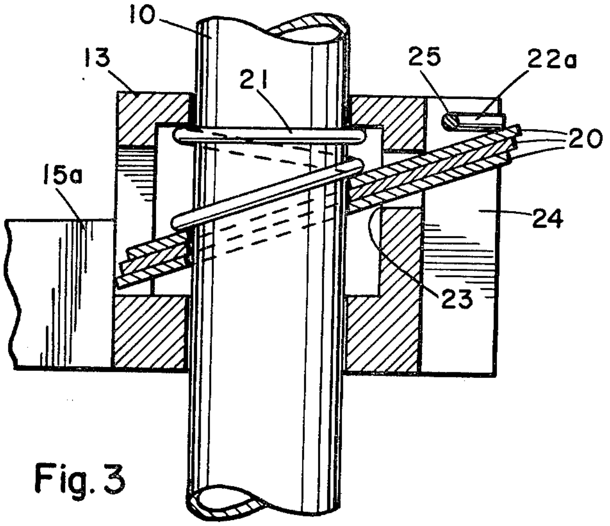
FIG. 3 is an enlarged cross sectional view of the clamping apparatus that forms part of the apparatus illustrated in FIGS. 1 and 2.

Referring now to FIG. 3, there is illustrated a preferred mechanism for manually clamping collar 13 to shaft 10. This stops the collar from sliding on the shaft after the yoke 14 has been positioned around the wheel of a chair. The clamping mechanism includes a plurality of washers 20 lying on top of one another within collar 13. These washers have respective holes that are centered with the hole of collar 13 and through which shaft 10 passes. A spring 21 is also included as part of the clamping mechanism. In operation, the spring exerts a force on the washers, which in turn bind against shaft 10. As a result, the collar is rigidly held to shaft. Thus, components 13, 20, and 21 operate on the same principal as does the end portion of a #50 Pony Clamp.

Figure 4:
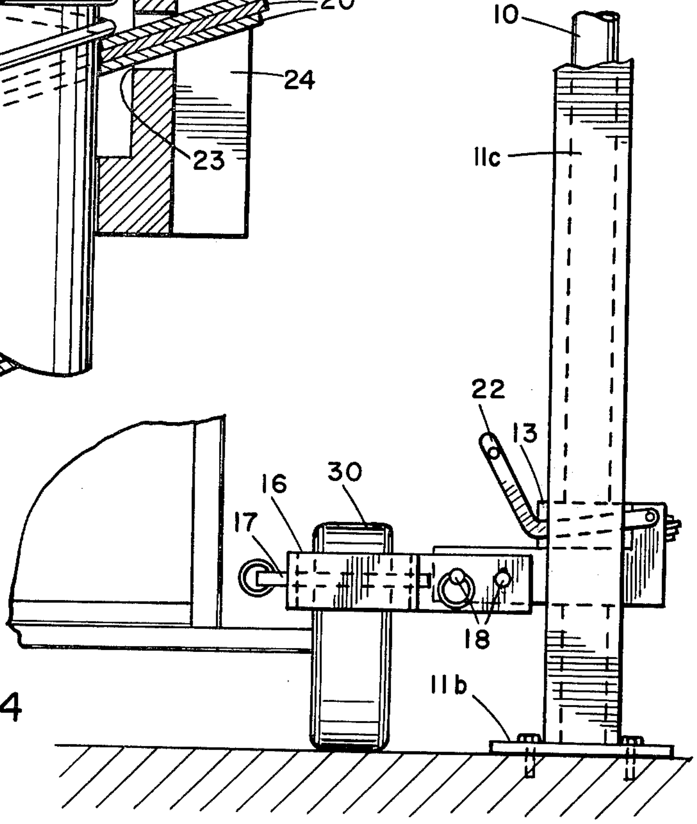
FIG. 4 illustrates how the safety apparatus of FIGS. 1 and 2 is utilized to hold motorized wheelchairs in place.

This binding force is overcome by means of a manually operated lever arm 22 (FIG. 4). A portion 22*a* (FIG. 3) of the lever arm exerts a force on the washers 20 as indicated in FIG. 3. As a result, the washers pivot on a portion of the collar as indicated via reference numeral 23, which thus removes the binding force from shaft 10. A bracket 24 connects to collar 13 to provide a pivot pin 25 for the lever arm.

Figure 5:
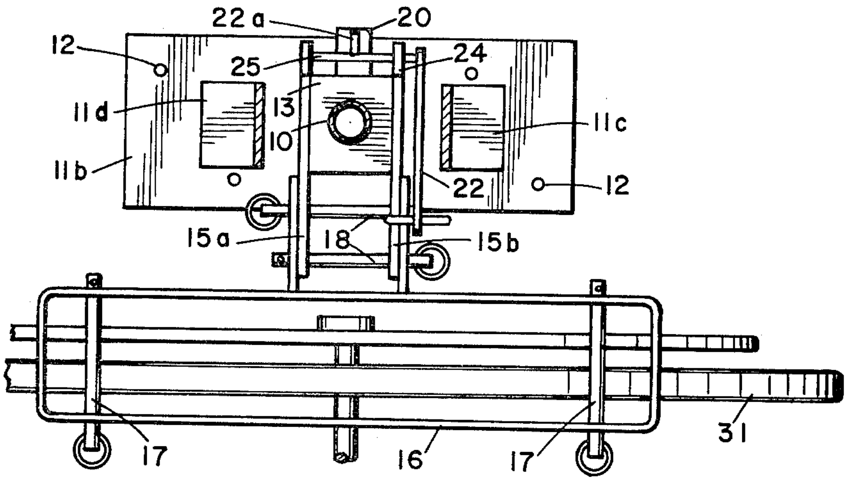
FIG. 5 illustrates how the safety apparatus of FIGS. 1 and 2 is utilized to hold non-motorized wheelchairs in place.

The manner in which yoke 14 actually holds a wheelchair in place is illustrated in FIGS. 4 and 5. In FIG. 4, the wheel 30 being held is approximately 6 inches in diameter (such as those which are typically mounted on a motorized wheelchair); whereas in FIG. 5, the wheel 31 being held is approximately 27 inches in diameter (such as those which are typically mounted on a hand operated wheelchair). In order to accommodate these various size wheels, the size of the opening of yoke 14 is adjusted by means of the pins 17 as was previously described above.

To place yoke 14 over wheel 30 or 31, a person simply lifts up on lever arm 25. This removes the binding force on collar 13 and allows the collar and yoke to be moved up on shaft 10. Thus, the top portion of the wheels 30 or 31 can readily be placed within the opening 16 of the yoke, There, the retaining pins 17 will lie on top of the wheel. The yoke and collar are then held firmly in place simply be letting go of the lever arm 25.

A preferred embodiment of the invention has now been described in detail. In addition however, many modifications and changes may be made to this embodiment without departing from the nature and spirit of the invention. Thus, it is to be understood that the invention is not limited to said details but is defined by the appended claims.

What is claimed is:

1. Safety apparatus for holding in place a wheelchair containing a handicapped occupant as they are being transported in a motorized vehicle, said apparatus being comprised of;

a rigid shaft having a length that exceeds the diameter of the largest wheel on said wheelchair;

means for rigidly supporting said shaft substantially perpendicular to the interior floor of said vehicle along one side of said largest wheel;

a collar mounted for vertical reciprocation on said shaft;

a yoke carried by said collar having a pair of spaced apart members extending transversely of said largest wheel and defining an opening therebetween for receiving the top portion of said wheel; and manually operable means for clamping said collar to said shaft to firmly hold said yoke against said wheel with the top portion of said wheel received in said opening.

2. Apparatus according to claim 1 wherein the size of said opening of said yoke is adjustable to accommodate wheels of various sizes.

3. Apparatus according to claim 2 wherein said members comprise removable pins for adjusting the size of said opening

4. Apparatus according to claim 1 wherein said yoke attaches to said collar by means of a pivot arm.

5. Apparatus according to claim 4 wherein said pivot arm includes one pair of parallel brackets rigidly connected to said collar, another pair of parallel brackets rigidly connected to said yoke, and a pair of removable pins extending through respective sets of aligned holes in each of said brackets.

6. Apparatus according to claim 1 wherein said clamping means includes a plurality of washers lying on one another within said collar and having respective holes centered with the hole of said collar, a spring within said collar for forcing said washers to bind against said shaft, and a lever arm connected to said collar for manually applying a counter balancing force on said washers to overcome said binding force.

7. Apparatus according to claim 1 wherein said means for rigidly supporting said shaft includes a top plate and a base plate rigidly attached to respective ends of said shaft and a pair of side posts connecting said top plate to said base plate.

* * * * *